May 24, 1932.  J. PETERSON  1,859,463
FROG FOR LISTER PLOWS
Original Filed March 18, 1929
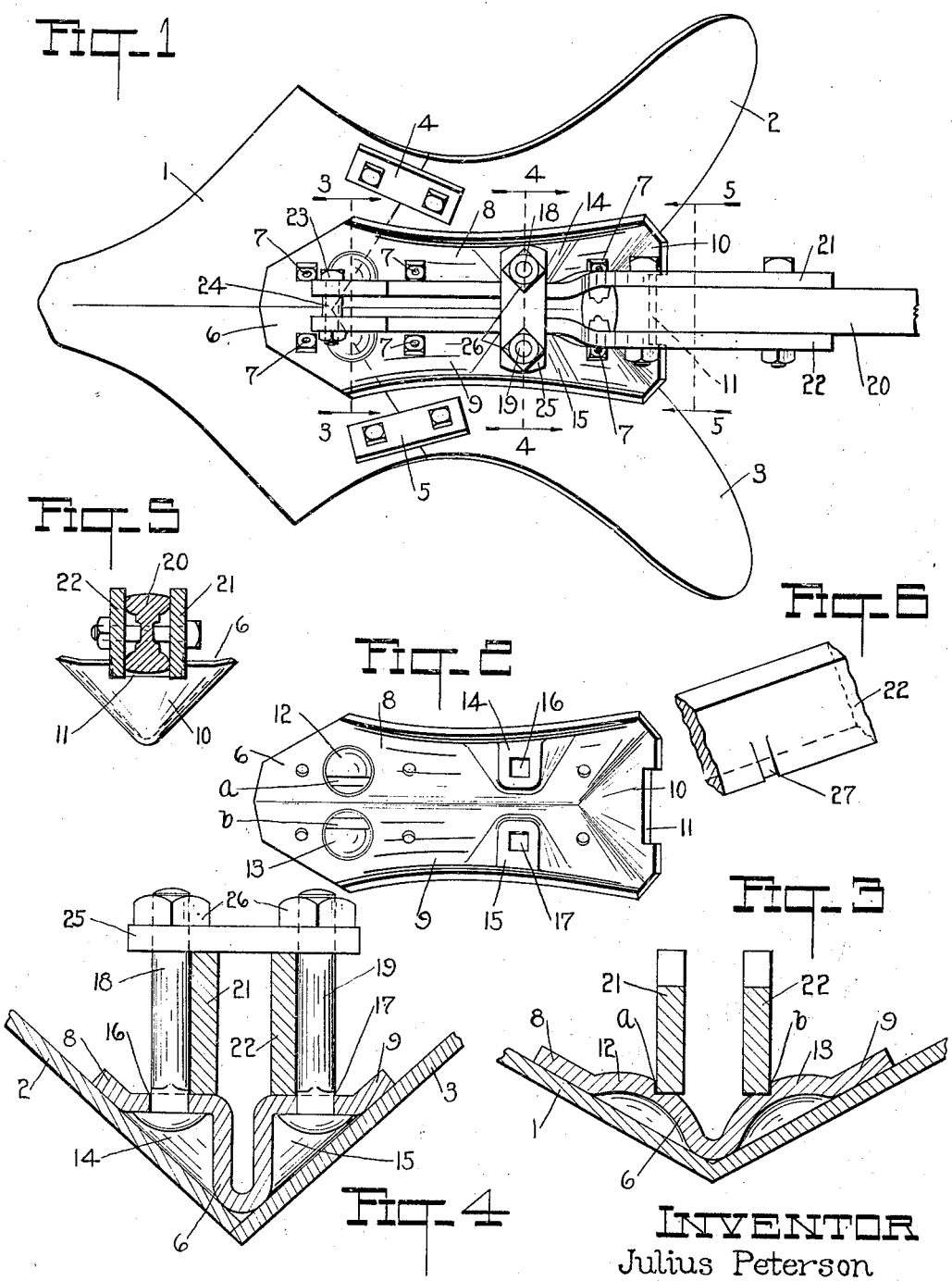
INVENTOR
Julius Peterson
WITNESS
A. D. McLeaf
BY
W. C. Judinston
ATTY.

Patented May 24, 1932

1,859,463

UNITED STATES PATENT OFFICE

JULIUS PETERSON, OF MOLINE, ILLINOIS, ASSIGNOR TO DEERE & COMPANY, OF MOLINE, ILLINOIS, A CORPORATION OF ILLINOIS

FROG FOR LISTER PLOWS

Application filed March 18, 1929, Serial No. 347,878. Renewed January 10, 1931.

My invention relates to lister plows and more particularly to an improved frog therefor possessing certain features of attachment by which the frog is secured to the plow body and to the plow beam. My invention has for its object to provide a frog with a new, simpler and more effective means of mounting it on a foot, attached to a plow beam, after the frog and plow body have been secured together.

Referring to the drawings in which like numerals indicate identical parts—

Figure 1 is a bottom plan view of a lister plow-body, showing my improved frog mounted thereon and a plow-beam attached to the frog;

Figure 2 is a bottom plan view of the frog.

Figure 3 is an enlarged detail section on the line 3—3 of Figure 1;

Figure 4 is a similar section on the line 4—4 of Figure 1;

Figure 5 is a detail section on the line 5—5 of Figure 1, and

Figure 6 is an enlarged detail of part of the foot, upon which the plow body is mounted and which is secured to the plow beam.

The plow body is composed of the share 1 and the moldboards 2 and 3, which are rigidly secured together by straps 4 and 5 bolted to the share 1 and the moldboards 2 and 3 respectively. The frog 6 is formed of flat stock and is bent at a central longitudinal line to present two sides in angular relation to each other to conform to the shape of the moldboards and shares to which the frog is rigidly secured by bolts 7. The rear of the sides 8 and 9 of the frog 6 are connected by a part 10, formed by bending and crowding in the excess metal of the bend of the sides 8 and 9, and having an extended notch 11 in its upper edge. Forwardly on the side 8 of the frog 6 is a protrusion 12, upset from the metal of which the frog is made, and a similar protrusion 13 is on the side 9 and in transverse alinement with 13, said protrusions being notched as at $a$ and $b$, for a purpose hereinafter stated. Between the ends of the frog 6 the sides of the latter are indented to form pockets 14 and 15 in which are rectangular openings 16 and 17. As previously stated the frog 6 is bolted to the share 1 and the moldboards 2 and 3, but previous to securing these parts together bolts 18 and 19 are inserted through the holes 16 and 17 with the bolt heads within the pockets 14 and 15.

To a plow beam 20 is secured, by suitable bolts, a foot composed of bars 21 and 22 which converge forwardly of their attachment to the beam 20 and are then parallel to their forward termination where they are held together by a bolt 23 inserted through suitable openings in the bars and through a tubular member 24 which serves to space the bars apart. With the assembly of the share, the moldboards, and the frog, the plow body is complete and ready to be mounted on the foot, and rigidly secured thereon.

In the operation of mounting the plow body on the foot, the latter being already in position on the beam 20, the plow body is placed with the foot between the bolts 18 and 19 with the notches $a$ and $b$ receiving between them the forward end of the foot, and the notch 11 receiving the rear thereof to hold the plow body and the foot firmly against lateral movement relative to each other. At this time I clamp the plow body and foot rigidly together by means of a plate 25 placed transversely of the foot and having rectangular openings to receive the bolts 18 and 19 which extend therethrough and are provided with nuts 26 by the operation of which the plate 25 clamps the plow body and foot rigidly together; any tendency toward a longitudinal movement of either the plow body or the foot is prevented by notches 27 in the bars 21 and 22 which engage with the sides of the notch 11 in the frog 6.

In the construction of a plow body, of which my frog forms a part, and the manner of securing a plow body to a support, such as shown and described, two bolts only are necessary to rigidly fasten such a plow body in place, the heads of the bolts being covered within pockets in the frog, and any tendency to either lateral or longitudinal movement of a plow body and its support, relative to each other, is prevented by means on the frog operating for that purpose as shown and described.

What I claim is—

1. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, bolt holes in said pockets, bolts having their heads in said pockets and projecting through said holes, a protrusion on the frog on each side of said line adjacent the forward end of the frog, a plow beam, a foot mounted on the plow beam and extending between said bolts, a plate extending transversely of said foot engaging with said bolts to clamp the foot and frog firmly together, and notches in said protrusions and in said closure to prevent a lateral movement of the foot and frog relatively to each other.

2. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, bolt holes in said pockets, bolts having their heads in said pockets and projecting through said holes, a protrusion on the frog on each side of said line adjacent the forward end of the frog, a plow beam, a foot mounted on the plow beam and extending between said bolts, a plate extending transversely of said foot engaging with said bolts to clamp the foot and frog firmly together, notches in said protrusions and in said closure to prevent a lateral movement of the foot and frog relatively to each other and notches in the foot to engage with the notch in the closure to prevent longitudinal movement of the frog and the foot relative to each other.

3. A frog for lister plows having sides extending at an angle from a central longitudinal line, a closure at the rear of the frog connecting the two sides and having a notch in the edge thereof, a protrusion on each side of said line adjacent the forward end of the frog, a notch in each protrusion adjacent said line, pockets one in each side of the frog and opposite each other, and bolt holes opening into said pockets.

4. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, bolt holes in said pockets, bolts having their heads in said pockets and projecting through said holes, a protrusion on the frog on each side of said line adjacent the forward end of the frog, a plow beam, a foot mounted on the plow beam and extending between said bolts, a plate extending transversely of said foot engaging with said bolts to clamp the foot and frog firmly together, and a notch in said closure to prevent a lateral movement of the foot and frog relatively to each other.

5. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, bolt holes in said pockets, bolts having their heads in said pockets and projecting through said holes, a protrusion on the frog on each side of said line adjacent the forward end of the frog, a plow beam, a foot mounted on the plow beam and extending between said bolts, a plate extending transversely of said foot engaging with said bolts to clamp the foot and frog firmly together, and notches in said protrusions to prevent a lateral movement of the foot and frog relatively to each other.

6. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, a protrusion on the frog on each side of said line adjacent the forward end of the frog, a plow beam, a foot mounted on the plow beam, means associated with said pockets for clamping the foot and frog firmly together, and notches in said protrusions and in said closure to prevent a lateral movement of the foot and frog relatively to each other.

7. A frog for lister plows having sides extending at an angle from a central longitudinal line, a closure at the rear of the frog connecting the two sides and having a notch in the edge thereof, a protrusion on each side of said line adjacent the forward end of the frog, pockets one in each side of the frog and opposite each other, and bolt holes opening into said pockets.

8. A frog for lister plows having sides extending at an angle from a central longitudinal line, a closure at the rear of the frog connecting the two sides, a protrusion on each side of said line adjacent the forward end of the frog, a notch in each protrusion adjacent said line, pockets one in each side of the frog and opposite each other, and bolt holes opening into said pockets.

9. In a lister plow, the combination of a plow body including a share, a moldboard, and a frog rigidly secured together, said frog bent on a central longitudinal line and conforming to the pattern of the share and moldboard, said frog having a transverse closure at its rear end, having a pocket intermediate its ends, and having a protrusion on each side of said line adjacent its forward end, a plow beam having a foot, and means for securing said foot to said frog, said means including a bolt having its head in said pocket and projecting through a hole in said frog, the front end of said foot having bearing on said protrusions and having bearing near its rear end on said closure.

10. In a lister plow, the combination of a plow body including a share, a moldboard, and a frog rigidly secured together, said frog bent on a central longitudinal line and conforming to the pattern of the share and moldboard, said frog having a transverse notched closure at its rear end, having a pocket intermediate its ends, and having a protrusion on each side of said line adjacent its forward end, a plow beam having a foot, and means for securing said foot to said frog, said means including a bolt having its head in said pocket and projecting through a hole in said frog, the front end of said foot having bearing on said protrusions and having bearing near its rear end in the notch of said closure.

11. In a lister plow, the combination of a plow body including a share, a moldboard, and a frog rigidly secured together, said frog bent on a central longitudinal line and conforming to the pattern of the share and moldboard, a transverse closure at the rear of said frog, a pocket in said frog on each side of said line intermediate the ends thereof, bolt holes in said pockets, bolts having their heads in said pockets and projecting through said holes, a protrusion on the frog on each side of said line adjacent the forward end of the frog, a plow beam, a foot mounted on the plow beam and extending between said bolts, and a plate extending transversely of said foot engaging with said bolts to clamp the foot and frog firmly together.

12. A frog of the class described having sides extending at an angle from a central longitudinal line, a closure at the rear end of the frog connecting the two sides, a protrusion on each side of the center line adjacent the forward end of the frog, pockets on each side of the center line of the frog and intermediate its ends, and a bolt hole in the frog opening into each pocket.

JULIUS PETERSON.